United States Patent
Leitner et al.

(10) Patent No.: US 7,117,343 B2
(45) Date of Patent: Oct. 3, 2006

(54) FETCHING INSTRUCTIONS TO INSTRUCTION BUFFER FOR SIMULTANEOUS EXECUTION WITH LONG INSTRUCTION SENSING OR BUFFER OVERWRITE CONTROL

(75) Inventors: Raimund Leitner, Mosburg (AT); Christian Panis, Wien (AT)

(73) Assignee: Infineon Technologies AG, Munich (DE)

( * ) Notice: Subject to any disclaimer, the term of this patent is extended or adjusted under 35 U.S.C. 154(b) by 540 days.

(21) Appl. No.: 09/946,851

(22) Filed: Sep. 4, 2001

(65) Prior Publication Data

US 2002/0083303 A1    Jun. 27, 2002

(30) Foreign Application Priority Data

Sep. 1, 2000    (DE) ................................ 100 43 003

(51) Int. Cl.
    *G06F 9/38*    (2006.01)
(52) U.S. Cl. ....................................... 712/215; 712/206
(58) Field of Classification Search .................. 712/23, 712/214, 215
    See application file for complete search history.

(56) References Cited

U.S. PATENT DOCUMENTS

| | | | | |
|---|---|---|---|---|
| 5,355,460 A | * | 10/1994 | Eickemeyer et al. | 712/215 |
| 5,442,760 A | * | 8/1995 | Rustad et al. | 712/215 |
| 5,446,850 A | * | 8/1995 | Jeremiah et al. | 712/215 |
| 5,504,923 A | * | 4/1996 | Ando | 712/23 |
| 5,530,816 A | | 6/1996 | Holt | 712/217 |
| 5,560,028 A | * | 9/1996 | Sachs et al. | 712/23 |
| 5,604,909 A | * | 2/1997 | Joshi et al. | 712/208 |
| 5,961,631 A | | 10/1999 | Devereux et al. | 712/207 |
| 6,154,828 A | * | 11/2000 | Macri et al. | 712/24 |
| 6,321,325 B1 | * | 11/2001 | Tremblay et al. | 712/204 |
| 6,480,938 B1 | * | 11/2002 | Vondran, Jr. | 711/125 |

FOREIGN PATENT DOCUMENTS

EP    0 457 403 A2    11/1991

* cited by examiner

*Primary Examiner*—Kenneth S. Kim
(74) *Attorney, Agent, or Firm*—Laurence A. Greenberg; Werner H. Stemer; Ralph E. Locher

(57) ABSTRACT

A program-controlled unit has a plurality of instruction-execution units for simultaneously executing successive instructions of a program that is to be executed. The program-controlled unit allows the number of access operations to a program memory storing the program that is to be executed to be reduced. The program-controlled unit has an assignment device which operates such that only the instructions for those instruction-execution units which are actually required for the execution of the program are stored in the program memory in which the program to be executed by the program-controlled unit is stored. The program includes a sequence of instructions which can be executed simultaneously. The assignment device allocates instructions that can be executed simultaneously to desired instruction-execution units for simultaneous execution, independent of each instruction's position within the sequence.

22 Claims, 3 Drawing Sheets

FETCHING INSTRUCTIONS TO INSTRUCTION BUFFER FOR SIMULTANEOUS EXECUTION WITH LONG INSTRUCTION SENSING OR BUFFER OVERWRITE CONTROL

BACKGROUND OF THE INVENTION

Field of the Invention

The invention relates to a program-controlled unit having a plurality of instruction-execution units for simultaneously executing successive instructions of a program.

Such a program-controlled unit is, for example, a superscalar processor. Superscalar processors have been known in a very wide variety of embodiments for many years and therefore require no further description here.

Superscalar processors operate more quickly than normal processors (processors operating according to the Von-Neumann Principle) with the same clock frequency owing to the simultaneous execution of a plurality of instructions of the program that is to be executed.

However, the manufacture and operation of a superscalar processor is also significantly more costly than a normal processor. Among other things, it is necessary to provide a plurality, for example five, instruction-execution units (in comparison with just one instruction-execution units in normal processors), but all the instruction-execution units are required simultaneously only on rather rare occasions. This is due to the fact that only certain instructions of a program can be executed simultaneously; for example instructions that access results of other instructions cannot be executed together with these other instructions. Thus, in an extreme case just a single unit of the instruction-execution units present may be required and all the other units may be placed in a passive state by NOP instructions or the like. These other instruction-execution units constitute an unnecessary load in phases in which they are not required: not only are they superfluous in such cases but their presence and their operation contribute to power consumption and heating of the program-controlled unit and/or of the system containing it, making them higher than would actually be necessary. The result of this is that in superscalar processors a comparatively large additional outlay has to be expended in comparison with the power increase that can be achieved in practice over normal processors.

SUMMARY OF THE INVENTION

It is accordingly an object of the invention to provide a program-controlled unit that overcomes the herein forementioned disadvantages of the heretofore-known devices of this general type and that reduces the outlay to be made in order to use a program-controlled units.

With the foregoing and other objects in view, there is provided, in accordance with the invention, a program-controlled unit including a plurality of instruction-execution units for simultaneously executing successive instructions of a program to be executed. The program-controlled unit includes an assignment device allocating the instructions to be executed to any desired instruction-execution unit for execution, independently of the instructions within the instruction sequences. The program-controlled unit also includes instructions to be executed simultaneously.

With the objects of the invention in view, there is also provided a program-controlled unit including a buffer and a plurality of instruction-execution units. The buffer includes a plurality of memory blocks for writing to and reading out independently of one another. The plurality of instruction-execution units is for simultaneously executing successive instructions of a program to be executed. The instructions to be executed are fetched from a program memory and written into the buffer.

With the objects of the invention in view, there is also provided a program-controlled unit including a plurality of instruction-execution units connected to a buffer and a program memory for simultaneously executing successive instructions of a program to be executed. The program-controlled unit are instructed by an instruction not to overwrite at least part of the buffer in which the instructions to be executed are buffered after being read out of the program memory, for a specific time or until the occurrence of a specific event.

The program-controlled units according to the invention are defined, in that an assignment device is provided that can allocate the instructions to be executed to any desired instruction-execution unit for execution, independently of the position of the instructions within the instruction sequences including the instructions to be executed simultaneously, in that the instructions to be executed are fetched from a program memory and written into a buffer that is provided in the program-controlled unit and includes a plurality of memory blocks that can be written to and read out independently of one another, and/or in that the program-controlled unit can be instructed by an instruction not to overwrite a buffer in which the instructions to be executed are buffered after being read out of the program memory, or not to overwrite a specific part of this buffer for a specific time or until the occurrence of a specific event.

By virtue of the fact that the program-controlled unit has an assignment device that operates as claimed, it is possible that only the instructions for those instruction-execution units that are actually required for the execution of the program are stored in the program memory in which the program to be executed by the program-controlled unit is stored, and that, during the determination of the instructions which are to be executed together, it is not necessary to take into account the fact that an instruction which can be a jump destination of a jump instruction is the first instruction of an instruction sequence including the instructions to be executed simultaneously.

As a result, the program memory can be made smaller or can accommodate a more extensive program, and less data has to be is read out of the program memory. This has the positive effect that the program-controlled unit can be made smaller and simpler in construction without losses of efficiency, concedes less energy and generates less heat.

The fact that the instructions to be executed are written into a buffer including a plurality of memory blocks that can be written to and read out independently of one another makes it possible for the instructions stored in the buffer to be subjected, in an instruction-fetching unit that is present only once in the program-controlled unit, to pre-processing that is performed simultaneously on a plurality of instructions. However, this does not prove exclusively to be an advantage because, without a time delay, it is possible for an assignment of the instructions, which has previously not been determined or only determined partially, to be made to the instruction-execution units which are to execute the instructions.

The fact that the program-controlled unit can be instructed by an instruction not to overwrite a buffer in which the instructions to be executed are buffered after being read out of a program memory, or not to overwrite a specific part of this buffer for a specific time or until the occurrence of a specific event, allows for the number of access operations to the program memory to be minimized.

As a result of the previously mentioned measures, the outlay that has to be made in order to manufacture and operate program-controlled units that can simultaneously execute successive instructions to a program that is to be executed can be kept smaller than has been the case hitherto.

Other features which are considered as characteristic for the invention are set forth in the appended claims.

Although the invention is illustrated and described herein as embodied in a program-controlled unit, it is nevertheless not intended to be limited to the details shown, because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In all the figures of the drawing, sub-features and integral parts that correspond to one another bear the same reference symbol in each case.

The program-controlled unit described below is a digital signal processor with a superscalar architecture. However, it is to be noted even at this point that the particular features of the program-controlled unit described below can also be used in other program-controlled units such as microprocessors or microcontrollers with superscalar architecture.

Figure 1:
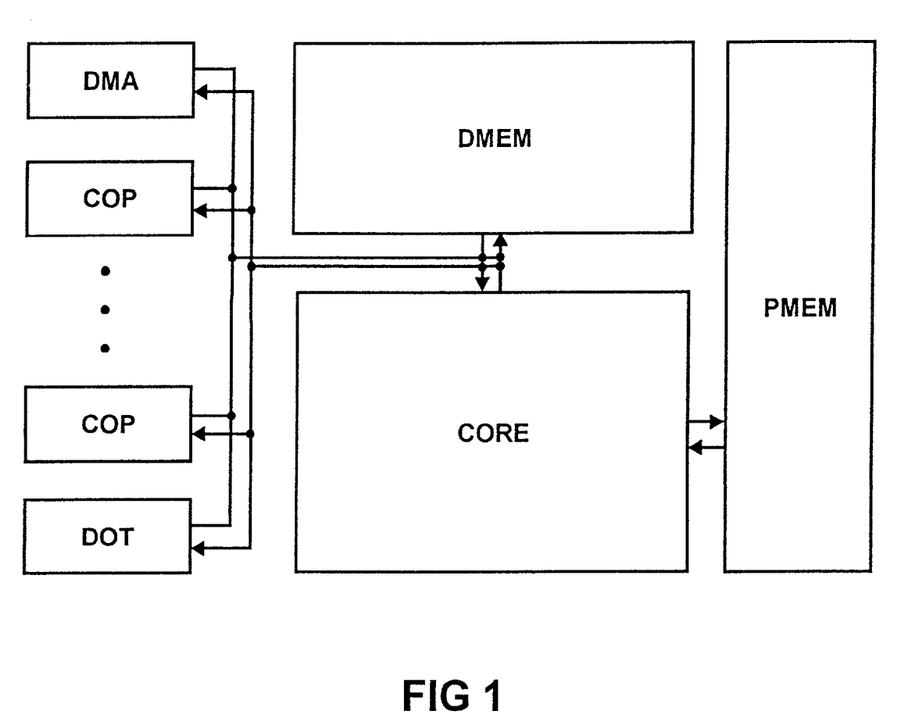
FIG. 1 is a block diagram showing a basic structure of a program-controlled unit described below.

Referring now to the figures of the drawings in detail and first, the principle structure of the program-controlled unit in question is shown in FIG. 1. The program-controlled unit in question includes a core CORE, a program memory PMEM, a data memory DMEM, a DMA controller DMA, a plurality of coprocessors COP, and a constant memory DOT, which are connected to one another via buses (not designated in detail in FIG. 1).

In the present case in particular the core CORE is of interest. The other components of the program-controlled unit shown in FIG. 1 are of secondary importance: they can also be provided outside the program-controlled unit or—apart from the program memory PMEM—be omitted; alternatively or additionally, the program-controlled unit can also contain other components.

The core CORE fetches the instructions to be executed from the program memory PMEM and executes them.

Figure 2:
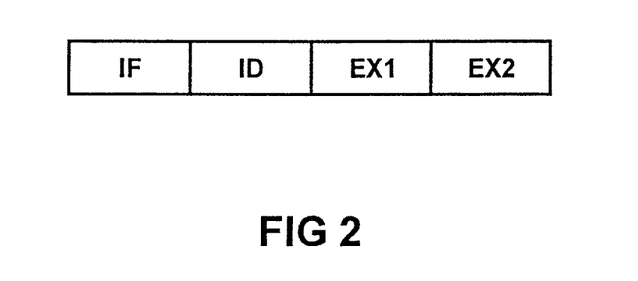
FIG. 2 is a block diagram showing an instruction-processing pipeline used in the program-controlled unit.

The fetching and execution of the instructions to be executed is carried out in the present case in a pipeline including four pipeline stages. The four pipeline stages are, as illustrated in FIG. 2, an instruction-fetching stage IF, an instruction-decoding stage ID, a first instruction-execution stage EX1 and a second instruction-execution stage EX2. It is to be noted already at this point that the invention is not restricted to the above; more or fewer pipeline stages can also be provided and/or the steps to be carried out in order to process instructions can also be distributed differently among the pipeline stages.

The core CORE contains
- an instruction-fetching unit which implements the instruction-fetching stage IF,
- a number of instruction-decoding units, implementing the instruction-decoding stage ID, corresponding to the number of instructions to be executed simultaneously;
- a number of first instruction-execution units, implementing the instruction-execution stage EX1, corresponding to the number of instructions to be executed simultaneously, and
- a number of second instruction-execution units, implementing the second instruction-execution stage EX2, corresponding to the number of instructions to be executed simultaneously.

For the sake of completeness, it will be noted that the core CORE is a core with a dual Harvard load/store architecture.

Such cores are—apart from the particular features described in more detail below—known so that further details will not be described here.

The particular features of the program-controlled unit are, in the example in question, the particular construction of the instruction-fetching stage; however, with a different pipeline structure it is possible that core components that implement other pipeline stages could also be affected by this.

The program-controlled unit in question, to be more precise the instruction-fetching unit thereof, is defined,
- in that in the instruction-fetching unit an assignment device is provided that can allocate the instructions to be executed to any desired instruction-execution units, independently of the respective position of the instructions within the instruction sequences including the instructions to be executed simultaneously,
- in that, it has an instruction cache,
- in that, it can be instructed by an instruction not to overwrite a buffer in which the instructions to be executed are buffered after being read out of the program memory, or not to overwrite a specific part of this buffer for a specific time or until the occurrence of a specific event.

These particular features can be used individually or in any desired combination.

In the example in question,
- an instruction has a length of 20 bits (normal instruction) or 40 bits (long instruction),
- the program memory PMEM is read out in units of 80 bits, and
- up to five instructions can be executed simultaneously, in which case the instructions can be normal instructions or long instructions independently of one another or can include up to two load/store instructions (for example Move instructions), up to two arithmetic/logic instructions (for example Add or And instructions), and a branch instruction (for example a Jump instruction).

The instruction sequences including instructions to be executed simultaneously are designated below as instruction bundles: the program-controlled unit executes the instructions to be executed in units of instruction bundles. Which instructions belong respectively to an instruction bundle is determined in the example in question during the programming or during the conversion, carried out for example by a compiler, an assembler and/or a linker, of the program written for the program-controlled unit into a program which is to be executed.

The assignment device designated below as an aligner makes it possible for the program that is to be executed by the program-controlled unit and is stored in the program memory PMEM to contain only in each case instructions for those instruction-execution units which are actually required for the execution of the program, and not to contain any instructions for instruction-execution units which are not required.

Figure 3:
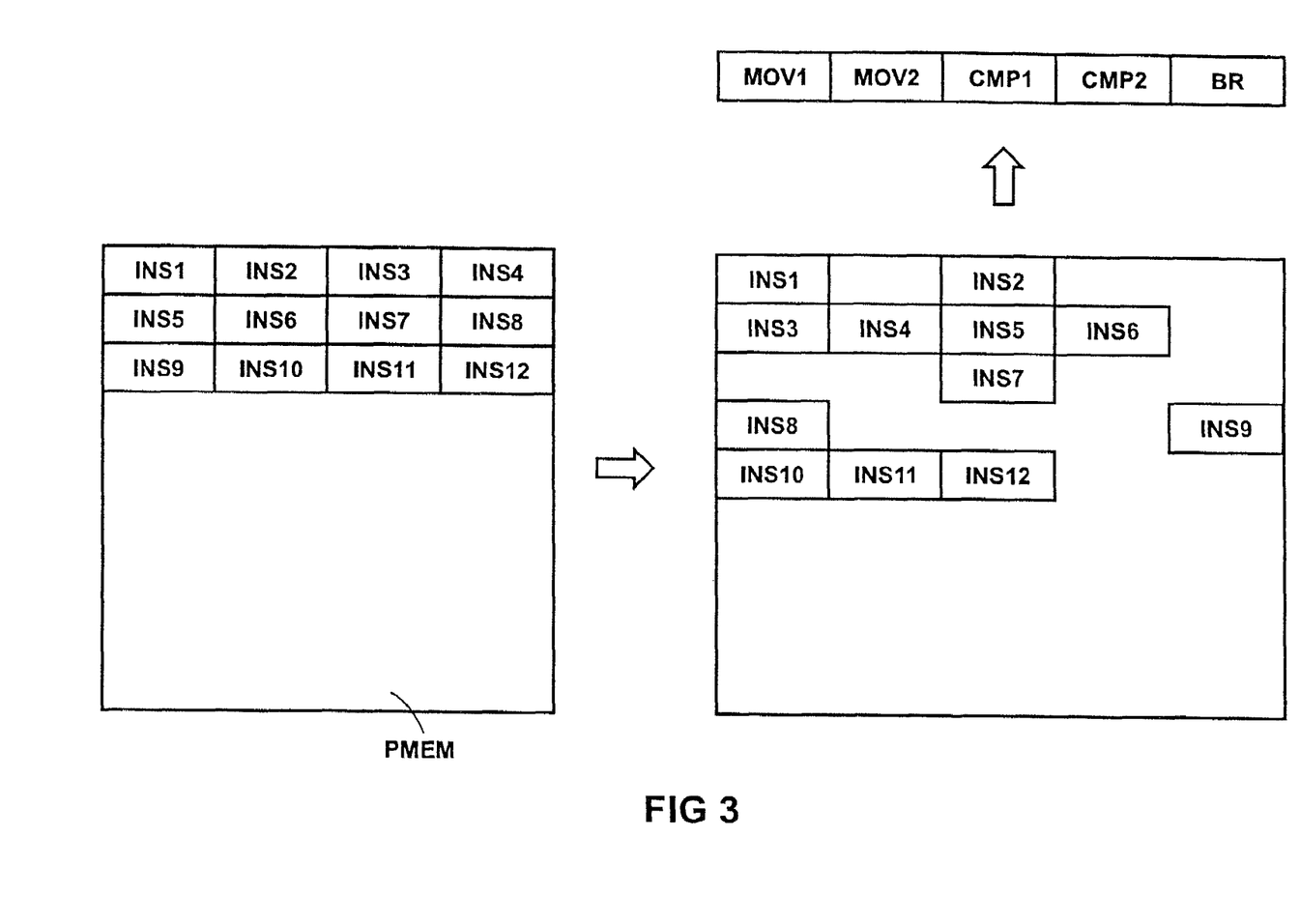
FIG. 3 is a schematic view of the assignment of instructions to be executed by the program-controlled unit to the instruction-execution units present.

An example is illustrated in FIG. 3. The configuration shown in FIG. 3 shows the program memory PMEM and five instruction-execution units designated by the reference symbols MOV1, MOV2, CMP1, CMP2, and BR.

For the sake of completeness, it is to be noted that the instruction-execution units MOV1 and MOV2 are instruction-execution units for executing load/store instructions, the instruction-execution units CMP1 and CMP2 are instruction-execution units for executing arithmetic/logic instructions, and the instruction-execution unit BR is an instruction-execution unit for executing a branch instruction.

Instructions INS1, INS2, . . . INS12 are stored in the program memory PMEM, in which case
the instructions INS1 and INS2,
the instructions INS3 to INS6,
the instruction INS7,
the instructions INS8 and INS9, and
the instructions INS10 to INS12 are to be respectively executed simultaneously, and in which case
the instructions INS1, INS3, INS4, INS8, INS10, and INS11 are load/store instructions,
the instructions INS2, INS5, INS6, INS7, and INS12 are arithmetic/logic instructions, and
the instruction INS9 is a branch instruction.

The aligner can detect this and assigns the individual instructions, as illustrated in FIG. 3, to the correct instruction-execution unit at the correct time. More details will be given later on how this takes place.

The aligner dispenses with the need to use instruction bundles of constant length. The instruction bundles only have to respectively contain as many instructions as is absolutely necessary to execute the program; it is no longer necessary to include in the instruction bundles NOP instructions or the like for the instruction-execution units that are respectively not required—as has been the case hitherto.

Without aligners, the instruction bundles must respectively include a number of instructions corresponding to the number of instruction-execution units present because the assignment of the instructions contained in the instruction bundles to the instruction-execution units is made in accordance with the position of the respective instructions within the instruction bundles. That is to say, the first instruction of an instruction bundle is always executed by a specific first instruction-execution unit, the second instruction of a respective instruction bundle is always executed by a specific second instruction-execution unit, the third instruction of an instruction bundle is always executed by a specific third instruction-execution unit, etc.

Providing an aligner reduces the number of instructions that must be stored in the program memory PMEM and fetched from it. This is illustrated for example in FIG. 4, which compares the instructions that must be stored with and without the provision of the aligner in the program memory PMEM and fetched from it. The example illustrated in FIG. 3 is used as the basis here.

Figure 4:
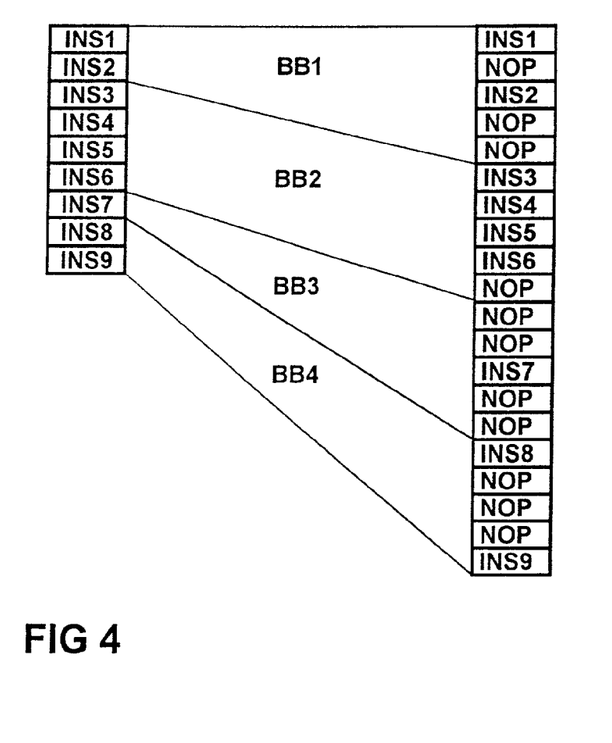
FIG. 4 is a block diagram showing the instructions to be stored in a program memory of the program-controlled unit and the instructions to be stored in the program memory in a conventional program-controlled unit for the execution of the exemplary program.

The left column of FIG. 4 illustrates the content of the program memory PMEM for the case in which the flexible assignment, described above and carried out by the aligner, of the instructions to the instruction-execution units takes place; The right side of FIG. 4 illustrates the content of the program memory PMEM for the case in which a fixed assignment, depending on the position of the instructions in the instruction bundles, of the instructions to the instruction-execution units takes place. Here, B1 to B4 designate the respective instruction bundles, and NOP designates the (NOP) instructions that, in the case illustrated in FIG. 4, have to be additionally stored in the program memory PMEM and fetched from it.

As is apparent from FIG. 4, the number of instructions to be stored in the program memory PMEM and fetched from it is reduced to less than half by the provision of an aligner in the example in question.

This has the positive effect,
that the program memory PMEM can be made smaller and/or more extensive programs can be stored in it,
that less data has to be read out of the program memory PMEM.

In addition, the provision of an aligner makes it possible for the jump destination of jump instructions contained in the program to be any desired instruction within an instruction bundle; without an aligner jumps can be made only to the respective first instruction of a instruction bundle. This difference makes more efficient use of the instruction-execution units possible: it is not necessary to move an instruction, which could be executed with proceeding instructions, into the next instruction bundle, and thus executed only at a later time than would be theoretically possible, because it relates to a possible jump destination.

Figure 5:
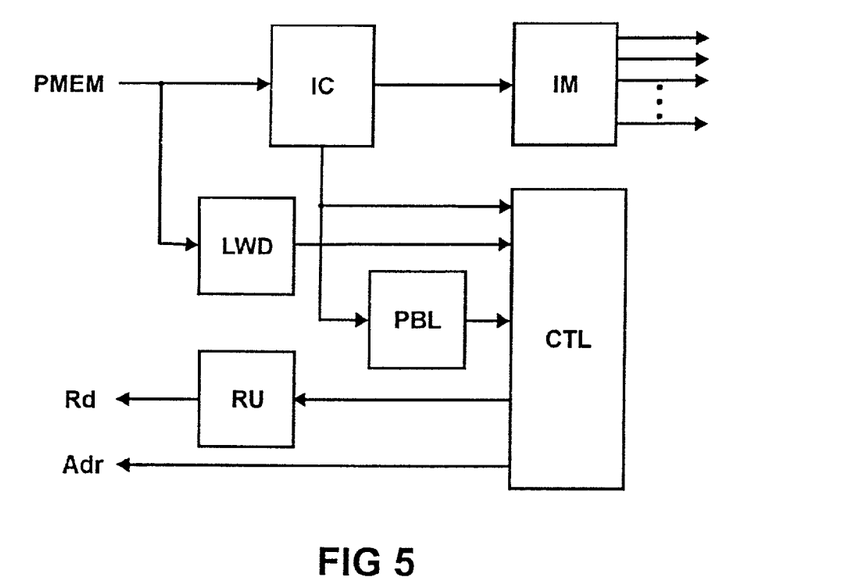
FIG. 5 is a block diagram showing a possible structure of the part of the program-controlled unit containing the assignment device performing the assignment illustrated in FIG. 2.

FIG. 5 shows the basic structure of the part of the program-controlled unit that fetches the instructions to be executed from the program memory PMEM and assigns them to the instruction-execution units.

The configuration shown is the instruction-fetching unit or part thereof and contains a read unit RU, an instruction cache IC, an instruction mapping unit IM, a longer-instruction sensing device LWD, a p-bit logic PBL and a control unit CTL.

Although this will be still clearer from the following explanations, for the sake of completeness, it is to be noted already at this point that the aligner which is of particular interest with regard to the program-controlled unit in question and which can assign the instructions to be executed by the program-controlled unit individually to the individual instruction-execution unit is formed by the instruction mapping unit IM, the long instruction-sensing device LWD, the p-bit logic PBL and parts of the control unit CTL.

The control unit CTL has a plurality of functions. A first function is that it controls the fetching of instructions from the program memory PMEM. To do this, it outputs to the program memory PMEM the address Adr from which data are to be read, and controls the read unit RU (which brings about the reading out). A second function of the control unit CTL is that it controls the assignment of the instructions to the instruction-execution units. To do this, it uses information which is supplied to it by the long instruction-sensing device LWD and the p-bit logic PBL, and further information that it extracts itself from the instructions, to generate data which determine the assignment, and outputs the data to the instruction mapping unit IM which implements the assignment in practice. The control unit CTL can or must also fulfil other functions; however, further details of this will not be given here.

The read unit RU outputs a read signal Rd to the program memory PMEM if data are to be read out of the latter, and causes the data that is subsequently output by the program memory PMEM to be transferred to the instruction cache IC. The read unit RU is formed in the example in question by a Moore automation or—even better—by a Mealy automation.

In the example in question, the instruction cache has a storage capacity of sixteen 20 bit words (16 normal instructions) and is divided into a plurality of blocks (into four blocks of equal size in the example in question), each block being embodied as a single buffer, and it being possible to write to and read out the individual blocks independently of one another and even simultaneously where necessary.

The long instruction-sensing device LWD checks whether the instructions fetched from the program memory PMEM are normal instructions or long instructions and outputs the result to the control unit CTL. In the example in question, it is possible to determine whether a long instruction is present from specific bits of the data representing the instructions. This check is preferably made already during the actual writing of the instructions into the instruction cache IC in order to avoid delays. The data that is output from the program memory PMEM is, in this case, not only fed to the instruction cache IC but also to the long instruction-sensing device LWD. In the example in question, the results of the check are stored in the long instruction-sensing device LWD until the control unit CTL requires the respective information.

The p-bit logic PBL examines the instructions stored in the instruction cache, determines which instructions belong to an instruction bundle (which instructions are to be executed simultaneously), and transfers the result to the control unit CTL. Which instructions belong to an instruction bundle can be determined in the example in question from a specific bit, designated below as P-bit, of the data representing the instructions. In the example in question, this P-bit has the value 0 at the last instruction of each instruction bundle, and the value 1 in all other cases; if an instruction bundle contains just a single instruction, the P-bit of this instruction has the value 0. Of course, it would also be possible for the P-bit of the last instruction of an instruction bundle to have the value 1, and the value 0 in all other cases. It would also be conceivable for the P-bit of the respective first instruction of an instruction bundle to have a particular value. In order to avoid delays that could be caused by the sensing and evaluation of the P-bit, the P-bit logic has a plurality of subunits operating in parallel; in the present case a separate P-bit logic subunit is assigned to each block of the instruction cache IC.

The control unit CTL also itself carries out checks on the instructions to be executed. In particular, it determines the instruction type of the respective instructions. In the example in question it checks whether the instruction is a load/store instruction, an arithmetic/logic instruction or a go branch instruction. The checking is carried out in the present case by reference to the values to specific bits of the data representing the instructions.

The control unit CTL can then determine which instruction cache entry is to be assigned to which instruction-executing unit using the information which is available to the control unit CTL, namely the information that is received by the P-bit logic PBL and which indicates which of the instructions stored in the instruction cache IC are to be executed together (where the instructions to be executed together are located within the instruction cache IC), the information which is received from the long instruction-sensing device LWD and which indicates which of the instructions to be executed together are normal instructions and which of the instructions to be executed together are long instructions, and the information determined by the unit itself which indicates which instruction types the instructions to be executed together are.

The result of the determination includes, in the example in question, data or signals for actuating multiplexers present in the instruction-mapping unit IMU.

The instruction mapping unit IMU sets up the connections between the instruction cache memory locations in which the instructions to be executed together are stored, and the instruction-decoding units which are assigned (connected upstream) to the instruction-execution unit that have to execute the respective instructions. This takes place in the example in question by multiplexers. In the present case, the instruction-mapping units IMU contains a number of multiplexers that is twice as large as the number of instruction-executing units present. Each multiplexer has at least a number of input terminals corresponding to the number of instruction cache locations, and an output terminal. At the same time, the input terminals of each multiplexer are connected to all the instruction cache memory locations, and the output terminals of the multiplexers are connected to one instruction-decoding unit each, two multiplexers being assigned to each instruction-decoding unit, with the result that each instruction cache entry can be fed to any desired instruction-decoding unit via the multiplexers.

The assignment of two multiplexers to each instruction-executing unit is due to the fact that each of the instruction-executing units can optionally execute normal instructions or long instructions, and that normal instructions occupy one memory location in the instruction cache IC, and long instructions occupy two memory locations in the instruction cache IC.

The instruction-execution units for which there is no instruction present in an instruction bundle are deactivated for the duration of the execution of this instruction bundle or are provided with instructions (for example NOP instructions) which, or the execution thereof, does not or cannot adversely affect the ordinary execution of the program to be executed. The latter can be carried out, for example, by the multiplexers of the instruction-mapping unit having an additional input terminal which is connected to a memory device which stores such an instruction, and the multiplexers being activated in such a way that they connect through the data supplied to this input terminal if an instruction bundle is executed which contains no instructions for instruction-execution units to which the respective multiplexers are assigned.

As has already been explained above, the program-control unit can be instructed by an instruction not to overwrite a buffer in which the instructions to be executed are buffered after being read out of the program memory, or not to overwrite a specific part of this buffer for a specific time or until the occurrence of a specific event. As a result, it is possible to forcibly cause short loops to be made out of the instruction cache without repeated reading of the instructions out of the program memory. This has the positive effect that the number of read access operations to the program memory is minimized. The aforesaid instruction is preferably already decoded and executed in the instruction-fetching unit (for example in the control unit CTL); there could be provision for this instruction to be recorded as a particular instruction type, as a result of which it could be recognized quickly and simply that it is a particular instruction.

The particular features described above of the program-controlled unit in question make it possible—independently of the individual details of the practical implementation thereof—to keep the outlay which has to be made in order to manufacture and operate program-controlled units which can execute simultaneously successive instructions of the program to be executed lower than has previously been the case.

We claim:

1. A program-controlled unit, comprising:
   a plurality of instruction-execution units for simultaneously executing successive instructions of a program having a sequence of instructions to be executed simultaneously;
   an assignment device allocating instructions to be executed simultaneously to desired instruction-execution units for simultaneous execution, independently of a position of each of the instructions within the sequence of instructions;
   a long instruction-sensing device determining how long the instructions to be executed are before said assignment device allocates the instructions to be executed simultaneously to said instruction-execution units;
   an instruction-fetching stage for fetching said instructions in a fetching operation; and
   said instructions to be executed simultaneously can be obtained in more than one fetching operation.

2. The program-controlled unit according to claim 1, further comprising a pipeline structure including said instruction-fetching stage, an instruction-decoding stage, and at least one execution stage.

3. The program-controlled unit according to claim 2, wherein said assignment device is a component of an instruction-fetching unit forming said instruction-fetching stage.

4. The program-controlled unit according to claim 1, including a p-bit logic determining the instructions to be executed simultaneously before said assignment device allocates the instructions to be executed simultaneously to said instruction-execution units.

5. The program-controlled unit according to claim 4, wherein said p-bit logic determines the instructions to be executed simultaneously by evaluating relevant information in data representing the instructions to be executed.

6. The program-controlled unit according to claim 1, wherein said long instruction-sensing device determines how long the instructions to be executed are by evaluating relevant information in data representing the instructions to be executed.

7. The program-controlled unit according to claim 1, including a control unit determining an instruction type of each of the instructions to be executed before said assignment device allocates each of the instructions to be executed simultaneously to said instruction-execution units.

8. The program-controlled unit according to claim 7, wherein said control unit determines the instruction type of each of the instructions to be executed by evaluating relevant information in data representing the instructions to be executed.

9. The program-controlled unit according to claim 1, including:
   a program memory for storing the instructions to be executed;
   a buffer; and
   a control unit fetching the instructions to be executed from said program memory and writing the instructions to be executed into said buffer.

10. The program-controlled unit as claimed in claim 9, wherein said buffer is an instruction cache.

11. The program-controlled unit according to claim 9, wherein said buffer includes a plurality of memory blocks for writing to and reading out independently of each other.

12. The program-controlled unit according to claim 11, wherein each of said memory blocks is a cyclical buffer.

13. The program-controlled unit according to claim 11, wherein each of said memory blocks has a storage capacity corresponding to a data quantity read from said program memory per reading operation.

14. The program-controlled unit according to claim 11, wherein:
   the instructions to be executed are stored in respective memory blocks of said buffer;
   said control unit determines the instructions to be executed simultaneously;
   instruction-decoding units assigned respectively to said instruction-execution units executing the respective instructions;
   after determining which of the instructions to be executed simultaneously has to be executed by which of said instruction-execution units, said assignment device connects said memory blocks of said buffer storing the instructions to be executed simultaneously to said instruction-decoding units assigned to said instruction-execution units executing the respective instructions.

15. The program-controlled unit according to claim 14, including multiplexers interconnecting respectively said memory blocks and said instruction-decoding units.

16. The program-controlled unit according to claim 15, wherein said multiplexers connect each of said memory blocks of said buffer to a desired instruction-decoding unit of said instruction-decoding units.

17. The program-controlled unit according to claim 15, wherein at least one of said multiplexers is assigned to each instruction-execution unit, and wherein output terminals of said multiplexers assigned to an instruction-execution unit are connected to input terminals of the instruction-decoding unit assigned to the respective instruction-execution unit.

18. The program-controlled unit according to claim 15, wherein each of said multiplexers has at least a number of input terminals corresponding to a total number of said memory blocks of said buffer and said input terminals of each multiplexer are connected to each of said memory blocks of said buffer.

19. A program-controlled unit, comprising:
   a plurality of instruction-execution units for simultaneously executing successive instructions of a program having a sequence of instructions to be executed simultaneously;

an assignment device allocating instructions to be executed simultaneously to desired instruction-execution units for simultaneous execution, independently of a position of each of the instructions within the sequence of instructions;

a program memory for storing the instructions to be executed;

a buffer;

an instruction-fetching stage for fetching said instructions in a fetching operation, said instruction-fetching stage including a control unit for fetching the instructions to be executed from said program memory and writing the instructions to be executed into said buffer;

said instructions to be executed simultaneously can be obtained in more than one fetching operation;

the instructions to be executed including a given instruction not to overwrite at least a part of said buffer for a specific time.

20. The program-controlled unit according to claim 19, wherein the given instruction is executed in said control unit.

21. The program-controlled unit according to claim 19, wherein said instruction not to overwrite at least a part of said buffer until a specific event occurs is executed in said control unit.

22. A program-controlled unit, comprising:

a plurality of instruction-execution units for simultaneously executing successive instructions of a program having a sequence of instructions to be executed simultaneously;

an assignment device allocating instructions to be executed simultaneously to desired instruction-execution units for simultaneous execution, independently of a position of each of the instructions within the sequence of instructions;

a program memory for storing the instructions to be executed;

a buffer;

an instruction-fetching stage for fetching said instructions in a fetching operation, said instruction-fetching stage including a a control -unit for fetching the instructions to be executed from said program memory and writing the instructions to be executed into said buffer;

said instructions to be executed simultaneously can be obtained in more than one fetching operation;

the instructions to be executed including a given instruction not to overwrite at least a part of said buffer until a specific event occurs.

* * * * *

UNITED STATES PATENT AND TRADEMARK OFFICE
CERTIFICATE OF CORRECTION

PATENT NO.        : 7,117,343 B2                                    Page 1 of 1
APPLICATION NO. : 09/946851
DATED              : October 3, 2006
INVENTOR(S)       : Raimund Leitner et al.

It is certified that error appears in the above-identified patent and that said Letters Patent is hereby corrected as shown below:

<u>Column 12,</u>

Line 16, "including a a control unit" should read -- including a control unit --

Signed and Sealed this

Fifth Day of August, 2008

JON W. DUDAS
*Director of the United States Patent and Trademark Office*